US006768997B2

(12) United States Patent
Schirmer et al.

(10) Patent No.: US 6,768,997 B2
(45) Date of Patent: Jul. 27, 2004

(54) SYSTEM AND METHOD FOR CREATING A SEARCH QUERY USING MOVABLE ELEMENTS IN A GRAPHICAL USER INTERFACE

(75) Inventors: Andrew Schirmer, Andover, MA (US); Julia Vogelsang, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/317,184

(22) Filed: May 24, 1999

(65) Prior Publication Data

US 2002/0059297 A1 May 16, 2002

(51) Int. Cl.⁷ .............................................. G06F 17/30
(52) U.S. Cl. ............................. 707/102; 707/1; 707/3; 707/4; 707/5; 707/7; 345/968
(58) Field of Search ................... 345/333, 334, 345/339, 968, 766, 846, 856, 836–835, 866; 707/1–8, 9, 505–508, 100–104.1, 200–201

(56) References Cited

U.S. PATENT DOCUMENTS 5,175,814 A * 12/1992 Anick et al. ................ 345/835
5,442,781 A * 8/1995 Yamagata ...................... 707/3
5,838,317 A * 11/1998 Bolnick et al. .............. 345/764
5,933,145 A * 8/1999 Meek .......................... 345/835
5,950,190 A * 9/1999 Yeager et al. .................. 707/3
6,147,685 A * 11/2000 Bliss et al. .................. 345/769
6,202,064 B1 * 3/2001 Julliard .......................... 707/5
6,208,985 B1 * 3/2001 Krehel .......................... 707/3
6,317,739 B1 * 11/2001 Hirata et al. ................... 707/4
6,430,552 B1 * 8/2002 Corston-Oliver ............... 707/3
6,574,624 B1 * 6/2003 Johnson et al. ................ 707/5

FOREIGN PATENT DOCUMENTS

GB          2343530       * 5/2000     ................ 17/30

* cited by examiner

*Primary Examiner*—Srirama Channavajjala
(74) *Attorney, Agent, or Firm*—Mintz Levin Cohn Ferris Glovsky and Popeo PC

(57) ABSTRACT

A system and method for creating a Boolean search query. The system includes a field determining object which determines searchable fields of a database. The fields may be arranged as selectable tiles in a view for selection by a user. A user may select a particular tile for including in a search query using a field selecting object. A field arranging object may be used to arrange the tiles selected as blocks in a graphical display of a search query. The relative position of the blocks determines any Boolean logical operation(s) to be performed. Boolean operators may also be displayed in the view for selection by the user.

43 Claims, 4 Drawing Sheets

SYSTEM AND METHOD FOR CREATING A SEARCH QUERY USING MOVABLE ELEMENTS IN A GRAPHICAL USER INTERFACE

FIELD OF THE INVENTION

The invention relates to information systems, and more particularly to a system for formulating a search query using a graphical user interface that enables a user to selectively position tiles corresponding to searchable fields, where relative positions of the tiles represent logic operations between the searchable fields.

BACKGROUND OF THE INVENTION

Data search and retrieval systems for searching collections of data are known. Generally, these collections are stored in one or more databases. Databases typically include records containing one or more fields. Separate databases may be connected via one or more networks. Network users may desire to obtain information related to a particular topic from one or more of the databases. A data search and retrieval system operating on, for example, a client/server architecture, may be used to search the databases or specific fields to retrieve certain information. Some existing data search and retrieval systems enable a user to search using Boolean logic. Such logic is generally known and involves using search terms, one or more logical operators, and text string delimiters to perform a search. Typically, a particular syntax must be used.

Boolean logic is a logical combinatorial system that represents relationships between entities. For example, Boolean logic may be used to represent a relationship between two or more text strings (e.g., keywords). Boolean logic uses logical operators (e.g., AND, NOT, OR) and delimiters (e.g., quotation marks, parenthesis) to represent the relationship. Text strings separated by logical operators and within particular delimiters represent different relationships. Accordingly, a proper format must be used to determine the appropriate logic to be applied. For example, if the text string "computer and (screen or display)," is used in a search of a database, the search will yield all objects having "computer" and either "screen" or "display" located in the database. If, however, the text string is entered as, "(computer and screen) or display," the search will result in objects having both "computer" and "screen" or objects containing "display." Thus, the proper format must be used to obtain desired results.

Some systems also are designed for use with a only particular database. The system is programmed for use with a particular database and the searchable fields within the database are hard-coded into the system. These systems may not be used with other databases.

Additionally, in some systems, a predetermined number (e.g., two or more) of input blocks are fixed in location in a graphical user interface permitting a user to input search terms. A pull-down menu displaying a plurality of operators may be provided. One drawback with this type of system is the limited number of search terms that may be used.

These and other drawbacks exist in prior search and retrieval systems.

SUMMARY OF THE INVENTION

An object of the invention is to overcome these and other drawbacks in existing systems.

Another object of the invention is to provide a system and method that assist users with creating Boolean search queries.

Another object of the invention is to provide a system and method that display the searchable fields of a database as selectable tiles within a view.

Another object of the invention is to provide a system and method that permit users to perform a Boolean search based on the relative position of search terms within a search display.

Another object of the invention is to provide a system and method that permit users to edit the search by altering the relative position of search terms within a search display.

Another object of the invention is to provide a system and method that permits users to save and retrieve search definitions.

According to one embodiment of the invention, a system and method are provided that present users with a graphical user interface (GUI) for creating a Boolean search query for searching data or objects stored within a database. The GUI comprises a search display which may comprise one or more blocks, each block comprising one or more sub-blocks, and each sub-block comprising one or more input boxes. Each sub-block may comprise selectable search criteria. Logical operators may be located between the blocks and sub-blocks. The GUI may also comprise selectable tiles that identify searchable fields within a database. The selectable tiles may be displayed as field specific sub-blocks within the display.

The GUI permits a system user to create a Boolean search query by entering search terms in one or more input boxes of a sub-block within a block and adding blocks and sub-blocks. The relative position of search terms within a block, the blocks themselves, and the logical operator associated with the blocks and sub-blocks identifies the logical operation to be performed using the search terms.

According to another embodiment, the system identifies searchable fields within a database and presents these fields as selectable tiles within the GUI. The system user may select one or more tiles and position these tiles in one or more sub-blocks within one or more blocks. The sub-blocks and blocks may be auto-expandable to display additional sub-blocks or blocks when another is added or reduce the size or number of blocks when a sub-block is removed. The relative position of the blocks and sub-blocks and the logical operator located therebetween determines the Boolean logic to be applied to the search. The GUI may display the Boolean logic operators to be applied as selectable options. The system user is permitted to view a search query in an intuitive, graphical format to determine the results that will be produced.

The system user may edit a search query by rearranging sub-blocks and blocks within the view, adding or deleting search terms, selecting another logical operator, etc. Performing any of these editing functions alters the search to be performed and yields results that conform to the query edited. Initial and edited search queries may be saved for later retrieval.

DETAILED DESCRIPTION OF THE PREFERRED EMBODIMENTS

According to one embodiment of the invention, a system, method, and computer readable medium comprising computer readable program code embodied therein are provided for enabling a user to create a Boolean search query. By inserting text strings (e.g., keywords) into blocks of a display and arranging the blocks in a particular arrangement, a Boolean search query may be constructed in a graphical format.

Figure 1:
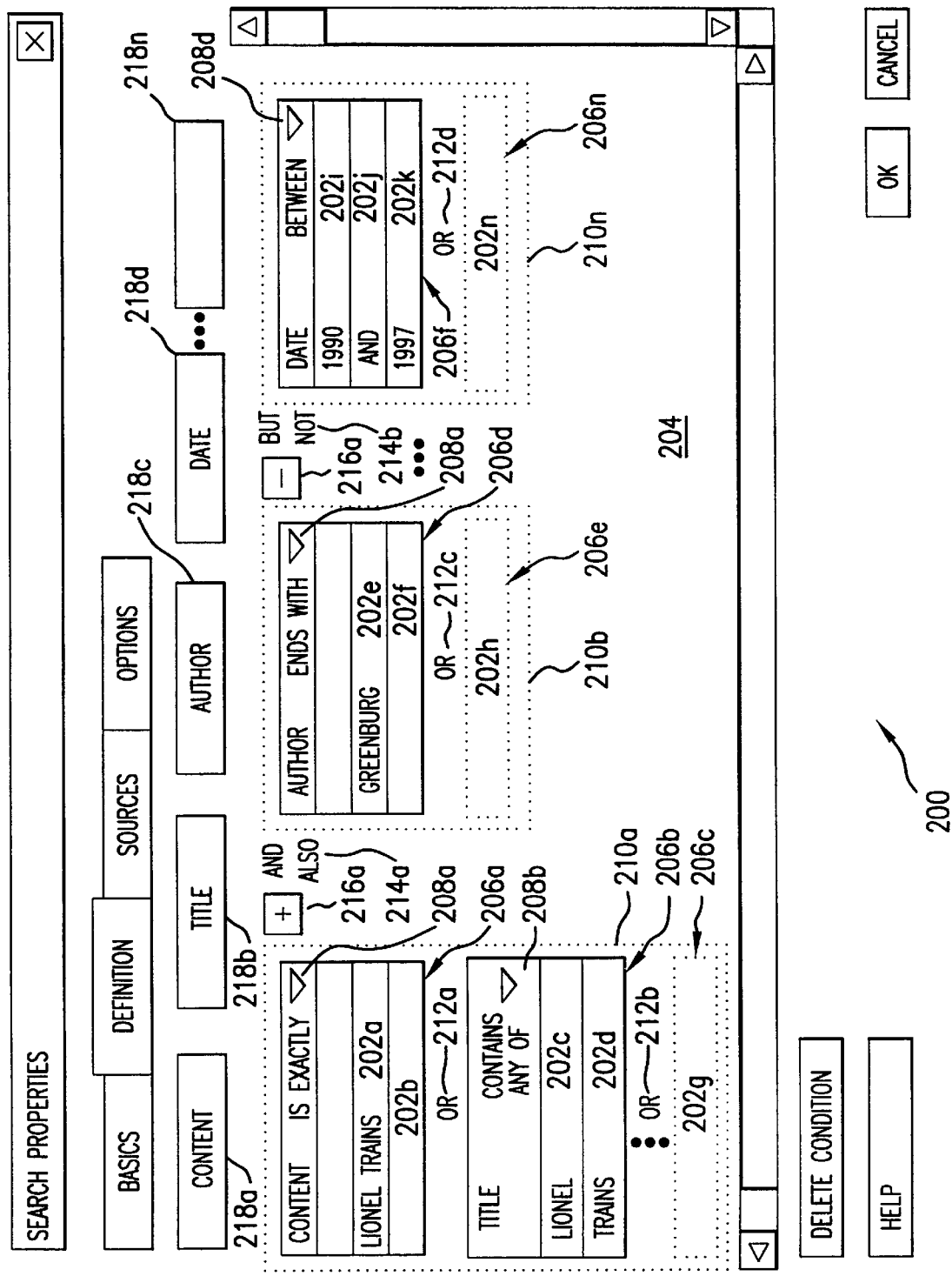
FIG. 1 is an illustration of a search formulation view in accordance with a preferred embodiment of the invention.

FIG. 1 illustrates an example of a graphical user interface (GUI) 200 in accordance with one embodiment of the invention. GUI 200 comprises input boxes 202a–202i, display 204, sub-blocks 206a–206n, selectable search criteria 208a–208d and blocks 210a–210n. Blocks 210a–210n may comprise one or more sub-blocks 206a–206n. Sub-blocks 206a–206n may comprise one or more input boxes 202a–202i and selectable search criteria 208a–208d. Logical operators 212a–212b and 214a–214b may be provided between sub-blocks 206a–206n and blocks 210a–210n, respectively. GUI 200 may also comprise selectable tiles 218a–218n identifying searchable fields within a database. Selectable tiles 218a–218n may be displayed as field specific sub-blocks 206a–206n within display 204.

Tiles 218a–218n may be displayed in GUI 200 after a search is invoked by a user and a searchable fields determination is made. A searchable fields determination may be performed by the system by submitting a request for searchable fields to a database (e.g., a document, file, data warehouse, etc.) identified by the user. After receiving a response from the database, tiles 218a–218n may then be presented. Tiles 218a–218n may display the searchable fields (e.g., content, author, title, date, etc.) identified by the database (or databases).

A user may construct a search query by selectively positioning one or more tiles 218a–218n as field specific sub-blocks 206a–206n in one or more blocks 210a–210n of display 204. Tiles 218a–218n may be moved, for example, by "clicking-and-dragging" tiles 218a–218n using a conventional computer mouse. After positioning one or more tiles 218a–218n within display 204, tiles 218a–218n may be displayed as field specific sub-blocks 206a–206n within blocks 210a–210n. Additional sub-blocks 206a–206n or blocks 210a–210n provide a graphical representation of another logical operation to be performed based on a logical operator positioned therebetween. A user may insert search parameters (e.g., keywords) for a particular field(s) into sub-blocks 206a–206n. Sub-blocks 206a–206n may contain search criteria 208a–208d. Search criteria 208a–208d may include user selectable options (e.g., "contains any of," "is exactly," "starts with," "ends with," "between," etc.). Search criteria 208a–208d may be displayed in a pull-down menu or other known format.

One or more sub-blocks 206a–206n may be displayed in blocks 210a–210n and one or more blocks 210a–210n may be displayed in display 204. Sub-blocks 206a–206n and blocks 210a–210n may be auto-expandable and auto-collapsible. For example, GUI 200 may present a single sub-block 206a within a single block 210a. When additional tiles 218a–218n are inserted into blocks 210a–210n, blocks 210a–210n may expand to display an additional sub-block 206n. Similarly, when tiles 218a–218n are inserted into display 204 and separated from blocks 210a–210b by logical operators 214a–214b, an additional block 210n may also be displayed. Empty sub-blocks 206n and blocks 210n may be displayed to provide a visual indication of the ability of display 204 to receive additional search terms. When tiles 218a–218n are removed from blocks 210a–210n, blocks 210a–210n may collapse to accommodate remaining tiles 218a–218n. As additional sub-blocks 206a–206n and blocks 210a–210n are inserted into display 204, logical operators 212a–212b and 214a–214b may also be displayed between sub-blocks 206a–206n and blocks 210a–210n, respectively. Sub-blocks 206a–206n within a single block 210a–210n may be separated by a logical operator 212a–212b (e.g., "OR"). Therefore, when a search is performed, search parameters displayed within a single block 210a–210n are applied to the search. Logical operators 212a–212b may be provided with user selectable options (e.g., a pull-down menu) for changing the logical operation to be performed within or between blocks 210a–210n.

According to another embodiment, the logical operation to be performed on sub-blocks 206a–206n and blocks 210a–210n may be coded into the system. The system may be coded to perform particular logical operations based on the orientation of sub-blocks 206a–206n and blocks 210a–210n. For example, the system may be coded to apply an "AND" operator to all horizontal blocks 210a–210 and an "OR" operation to all vertical sub-blocks 206a–206n. In this embodiment, logical operators 212a–212b and 214a–214b may be displayed without providing a mechanism to enable the user to select the logical operation to be performed.

Multiple blocks 210a–210n within display 204 may be separated by, for example, "AND" or "NOT" operators 214a–214b. Accordingly, search parameters for multiple blocks 210a–210n are "ANDed" or "NOTed" together as indicated. A user may select whether an "AND" or "NOT" (or other) logical operator is used by, for example, using selectors 216a–216b. Selectors 216a–216b may, for example, display a "+" (plus) sign if an "AND" operator is selected, and a "–" (minus) sign if a "NOT" operator is selected. Additionally, other known graphical representations may also be included in GUI 200. For example, an "OK" button may be displayed to submit a search, a cancel button may be displayed to interrupt a search, or other Windows™ related functions may be displayed.

A Boolean search is performed in accordance with the arrangement of display 204. For example, search parameters located within a single vertical block 210a–210n may be "ORed" together, and may be "ANDed" with additional blocks 210a–210n that are arranged in a horizontal manner. A user may change the search performed by changing the relative position of search criteria 208a–208b, adding or deleting keywords, or other manner.

Figure 2:
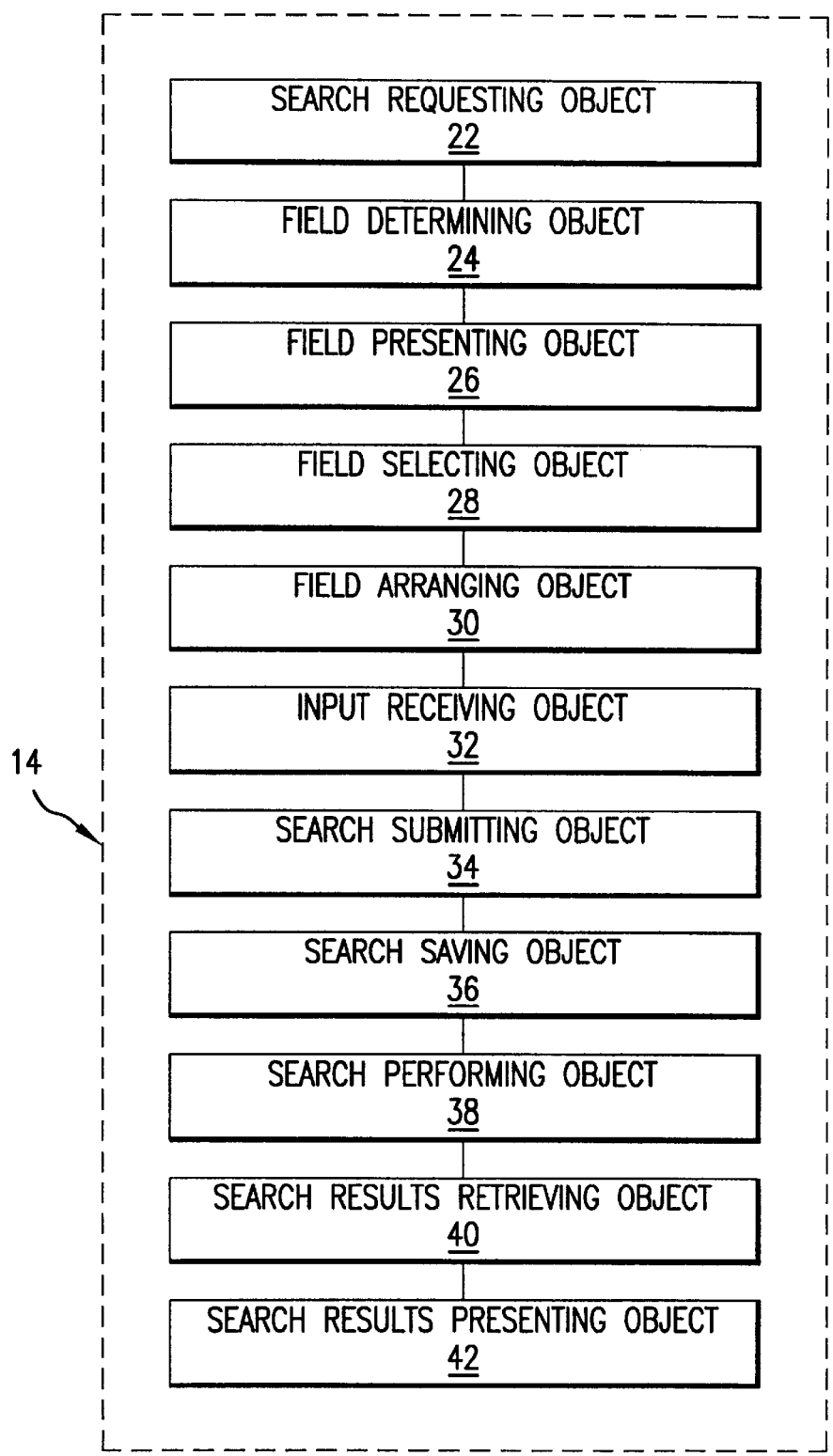
FIG. 2 is a schematic block diagram of a system for performing a Boolean search in accordance with a preferred embodiment of the invention.

FIG. 2 illustrates a search system 14 in accordance with one embodiment of the invention. Search system 14 may include a search requesting object 22 for enabling a user to request a search of a database. After requesting a search, a field determining object 24 may be used to determine the searchable fields within the database. Search system 14 preferably includes a field presenting object 26 which may, for example, present the searchable fields as selectable tiles within a GUI. A field selecting object 28 may be used to select tiles chosen by a user. After one or more tiles have been chosen, a field arranging object 30 may be used to arrange the tiles as blocks within the GUI.

Field presenting object 26, field selecting object 28, and field arranging object 30 preferably operate to allow a user to construct a Boolean search query. These objects permit search system 14 to display a GUI that allows users to construct a Boolean query that may be understood by a user who may be unfamiliar with Boolean logic. The arrangement of fields within the display are presented such that a Boolean search is displayed in a graphical format. The arrangement may be altered to represent various Boolean search queries.

An input receiving object 32 receives search parameters (e.g., keywords, files, images) to search for in the database. Search parameters may include, for example, words that may be found in a title or body of an object, dates, etc. The search parameters may be positioned within boxes in the display. The boxes may be arranged in a horizontal, vertical, or other manner. Search parameters in boxes in a horizontal arrangement, for example, may indicate a bound phrase, whereas search parameters in boxes in a vertical arrangement may indicate an unbound phrase. This format does not require a user to use text string delimiters (e.g., quotation marks, parenthesis) to indicate bound phrases.

After receiving user input, a search submitting object 34 may be used to submit the search to the database. Search system 14 preferably includes a search saving object 36 which stores the search in, for example, the database for later access. A search performing object 38 performs the search in accordance with the arrangement of the blocks within the display and the logical operations located therebetween. A search results retrieving object 40 retrieves the search results and a search results presenting object 42 presents the results to the user.

It should be understood that although multiple objects are described as being part of search system 14, such objects may be independent of search system 14 and reside on a different portion of a computer system. Also, the functions performed by one or more objects as described herein may be performed by other objects within a computer system.

Additionally, search system 14 may be provided on a computer readable storage medium and loaded onto a client. Other objects of search system 14 may also be provided on computer readable storage medium.

Figure 3:
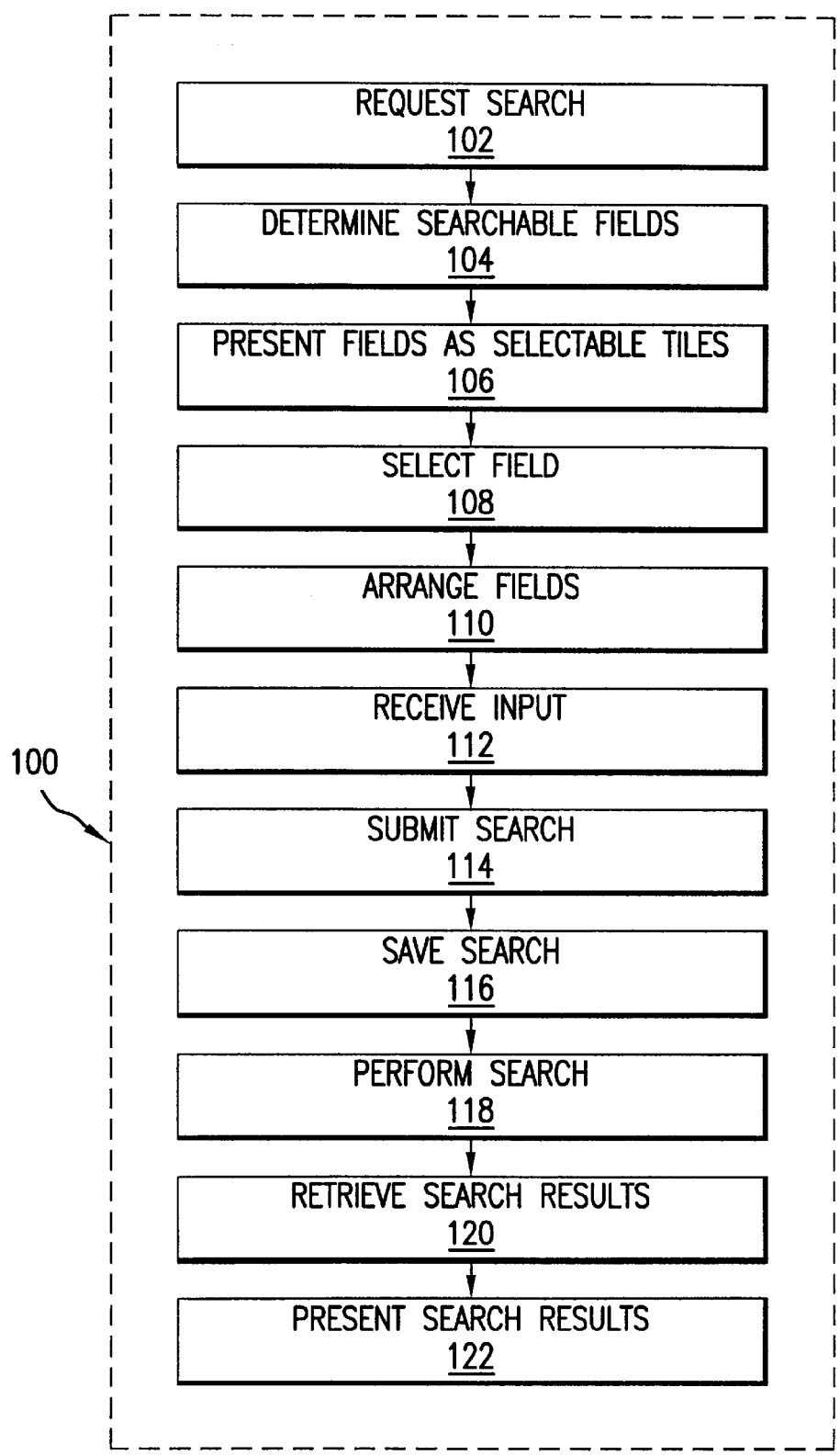
FIG. 3 is a schematic block diagram of a method for performing a Boolean search in accordance with a preferred embodiment of the invention.

A method of formulating a search in accordance with a preferred embodiment of the invention is illustrated in FIG. 3. According to this embodiment, a search method 100 formulates a search query in step 102. Step 102 requests a search of one or more databases for objects containing one or more fields. Step 104 may be included to determine the searchable fields within the databases. If step 104 is performed, the searchable fields may be displayed, for example, as selectable tiles in step 106. After the tiles are presented, a user may select desired tiles to be searched. Step 108 may be used for selecting the tiles chosen by the user. A user may select a tile in a variety of methods. For example, a user may select one or more tiles using a conventional computer mouse, a computer keyboard, voice activation, or by various other known manners.

Step 110 may be used to arrange the tiles as blocks within a display. Step 110 is preferably used to arrange the blocks in a Boolean equivalent format. For example, if the blocks are arranged in a horizontal sequence, search parameters may be "ANDed" together, and if the blocks are arranged in a vertical sequence, search parameters may be "ORed" together.

Step 112 permits users to enter search parameters into the blocks of the display. Search parameters input by a user form the contents of the blocks to which a logical operation is applied. The search parameters, however, may be searched in particular fields depending upon the block in which the search parameter is input. For example, a display may have left and right blocks. The left block may be an "Inventor" block selected from an "Inventor" tile and the right block may be an "Abstract" block selected from an "Abstract" tile. A user may input "Jones" into the "Inventor" block and "Telecommunications" into the "Abstract" block. If a search is performed for this display, the search will yield all objects in which "Jones" appears in the "Inventor" field and "Telecommunications" appears in the "Abstract" field of those objects. Keywords may be input, for example, by using a computer keyboard, voice, "pasting" copied text, or by various other known methods.

After a user has input one or more search parameters and positioned the blocks in a desired arrangement, a search may be submitted. Step 114 may be used to initiate the search. A user may submit a search in a number of methods. For example, the display may have an "OK" button which the user may select using a conventional computer mouse, keyboard, touch-pen, etc. Once a search has been submitted, step 116 may be used to store the search in, for example, a database, for later access. Step 118 may be used to locate objects within a database satisfying the search criteria of the display.

Upon completion of the search, step 120 may be used to retrieve the results of the search. Step 122 may then be used to display the search results (e.g., on a computer monitor).

An example of a search in accordance with one embodiment of the invention may be described with reference to FIG. 1. FIG. 1 illustrates a GUI 200 for searching a database for objects containing "Lionel Trains" as a bound phrase in a content field, either "Lionel" or "Trains" in a title field, an author field ending with "greenburg," and a date not between 1990 and 1997.

GUI 200 may comprise blocks 210a–210n. Block 210a may comprise a "Content" sub-block 206a, and "Title" sub-block 206b, and an additional sub-block 206n. Sub-blocks 206a and 206b may be inserted into block 210a by "clicking-and-dragging" "Content" tile 218a and "Title" tile 218b into block 210a. Block 210b may include an "Author" sub-block 206c and an additional sub-block 206n. Block 210n may comprise a "Date" sub-block 206d and an additional sub-block 206n. Each sub-block 206a–206d may include boxes 202a–202i. Boxes 202a–202d may be used to input search parameters. For example, "Content" sub-block 206a may include "Lionel Trains" in box 202a and an empty box 202b, "Title" sub-block 206b may include "Lionel" in box 202c and "Trains" in box 202d, "Author" sub-block 206c may comprise "greenburg" in box 202e and an empty box 202f, and "Date" sub-block 206d may include "1990" in box 202g, "and" in box 202h, and "1997" in box 202i as search parameters. Additional boxes may be located in each sub-block 206a–206n for enabling a user to insert additional search parameters. "OR" operators 212a–212n are located between each sub-block 206a–206n within each block 210a–210n. Search criteria 208a–208d may also be displayed in subblocks 206a–206d.

Search criteria 208a–208d may focus a search by identifying additional parameters to be applied to a search. For example, "Content" sub-block 206a includes an "is exactly" search criteria 208a. Therefore, only objects containing a bound phrase including "Lionel Trains" in the "Content" field match the criteria specified in "Content" sub-block 206a. "Title" sub-block 206b includes a "contains any of" search criteria 208b. Thus, an object having either "Lionel" or "Trains" in the title field matches search criteria 208b. Similarly, "Author" sub-block 206c includes an "ends with" search criteria 208c. Only objects that have an "Author" field ending with "greenburg" match search criteria 208c. Finally, "Date" sub-block 206d includes a "between" search criteria 208d. Therefore, only objects having a date field in which the date field is between 1990 and 1997 match search criteria 208d. Logical operators 214a–214b are provided between blocks 210a–210n. Specifically, an "AND ALSO" logical operator 214a is located between block 210a and 210b and a "BUT NOT" logical operator 214b is located between blocks 210b and 210n.

Applying the above search parameters and criteria to a search of a database yields all objects within the database in which "greenburg" is the author, the title contains either "Lionel" or "Trains," "Lionel Trains" is in the content field, and the object date is not between 1990 and 1997. Other search criteria may also be used.

Additionally, sub-blocks 206a–206d may be rearranged to alter the logical operations performed for the search. For example, "Title" sub-block 206b may be removed from block 210a by, for example, "clicking-and-dragging" to another portion of display 204 to create a new block. This modification alters the search by retrieving not objects that contain "Lionel Trains" in the content field or "Lionel" or "Trains" in the title field, but objects that contain both "Lionel Trains" in the content field and "Lionel" or "Trains" in the title field (and matching additional criteria).

Figure 4:
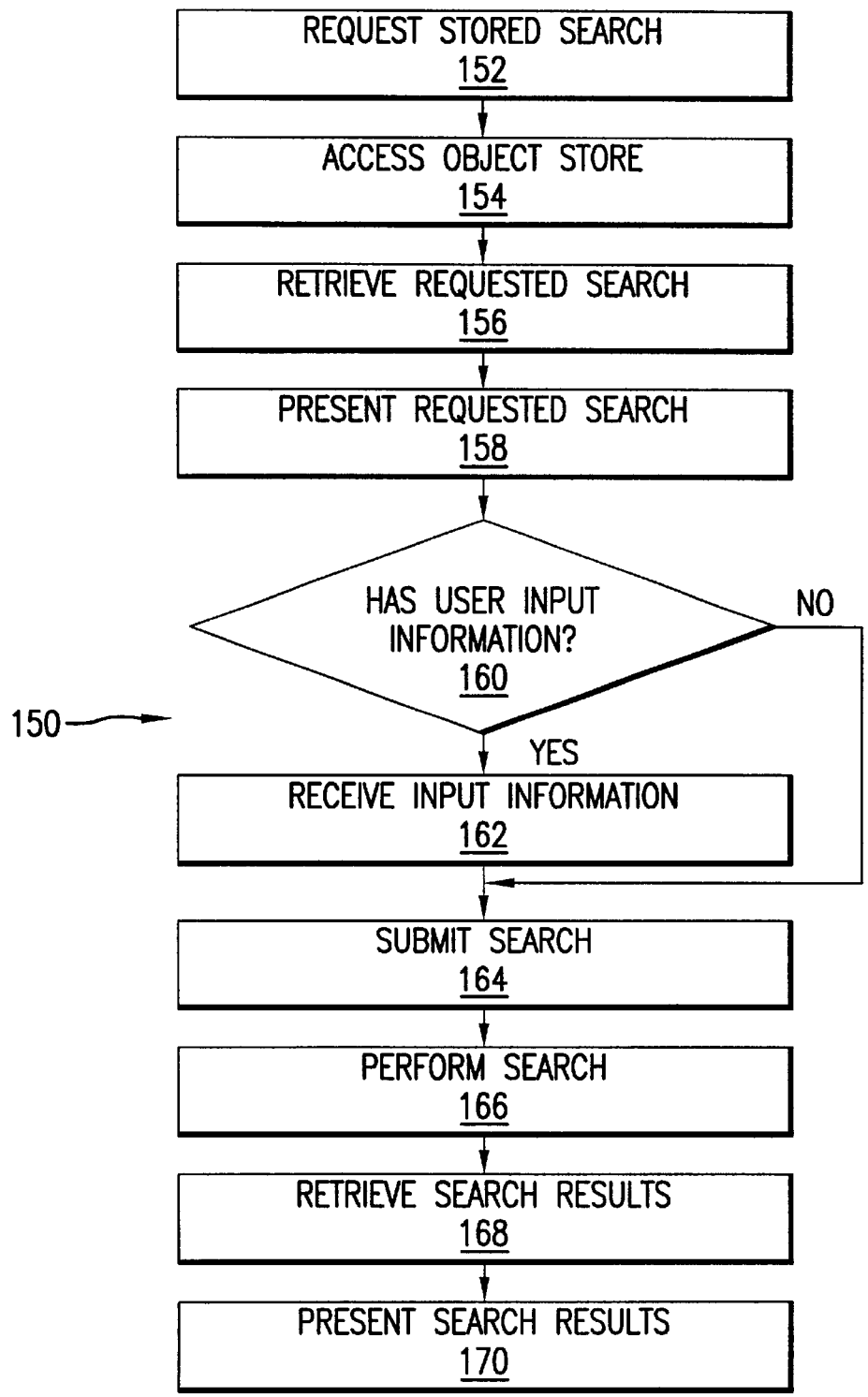
FIG. 4 is a schematic block diagram of a method for performing a Boolean search using a stored search in accordance with one embodiment of the invention.

FIG. 4 is a schematic block diagram of a method for performing a Boolean search using a stored search according to one embodiment of the invention. According to this embodiment, a search method 150 may include a request storage step 152. Step 152 may be used to request one or more searches stored by a user. Step 154 may then be used to access one or more object stores that store the one or more searches requested by the user in step 152. Step 156 may retrieve the one or more requested searches. Step 158 may be used to present the one or more requested searches to the user.

The user may request that a search be performed using a stored search or the user may modify the stored search by inputting information. Step 160 may determine whether the user has input information. If the user has input information, step 162 may be used to receive the information. If the user has not input information or after step 162 receives the information, method 150 may proceed to step 164. Step 164 may be used to submit the search desired by the user. Step 166 may then be used to perform the search submitted. The search results may be retrieved using step 168 and presented to the user using step 170.

Other embodiments and uses of the invention will be apparent to those skilled in the art from consideration of the specification and practice of the invention disclosed herein. For example, "database" as used herein is intended to include any collection of searchable content (e.g., an object store, data warehouse, file, etc.) that contains text, graphics, or other information. According to one specific embodiment of the invention, the interface may be used with Lotus Notes™ and operated on a Microsoft Windows™ operating system. The specification and examples should be considered exemplary only. The scope of the invention is only limited by the claims appended hereto.

What is claimed is:

1. A method for enabling a user to create a search query for searching a database, comprising:

providing a first block and a second block in a graphical user interface, said first block including a first user movable tile and said second block including a second user movable tile, each of said first user movable tile and said second user movable tile corresponding to at least one searchable field in the database;

in response to a user moving said first user movable tile of said first block relative to second user movable tile of said second block, providing a corresponding change in a relative position of said first block with respect to said second block, and automatically changing a logical operation between said first block and said second block from a first logical operation to a second logical operation based on said change in said relative position;

enabling a user to input a first search term in said first block and a second search term in said second block; and automatically generating a searching query for searching the database, wherein the search query includes the second logical operation between the inputted first search term and the inputted second search term.

2. A method for enabling a user to create a search query for searching a database, comprising:

providing a first block and a second block in a graphical user interface, said first block including a first sub-block, and said second block including a second sub-block, said first sub-block including a first user movable tile and said second sub-block including a second user movable tile, each of said first user movable tile and said second user movable tile corresponding to at least one searchable field in the database;

in response to a user moving said first user movable tile of said first sub-block relative to said second user movable tile of said second sub-block, determining a relative position of said first sub-block with respect to said second sub-block, and automatically assigning a logical operation between said first sub-block and said second sub-block based on the determined relative position of said first sub-block with respect to said second sub-block;

enabling a user to input a first search term in said first sub-block and a second search term in said second sub-block; and automatically generating a searching query for searching the database, wherein the search query includes the assigned logical operation between the inputted first search term and the inputted second search term.

3. A method for receiving and processing search queries for searching a database, comprising:

providing a plurality of tiles in a graphical user interface (GUI), each corresponding to a searchable field in the database, said plurality of tiles able to be dragged and dropped with the GUI;

providing a first block in a graphical user interface, said first block corresponding to one or more search query terms, said first block able to receive at least one of said plurality of tiles, said first block having at least one sub-block for specifying a value for at least one search query term for searching against the corresponding searchable field of the at least one of said plurality of tiles;

providing a second block in a graphical user interface, said second block corresponding to one or more search query terms, said second block able to receive at least one of said plurality of tiles, said second block having at least one sub-block for specifying a value for at least one search query term for searching against the corresponding searchable field of the at least one of said plurality of tiles;

enabling a user to drag one tile relative to another tile of said plurality of tiles; and in response to a user dragging said one tile to a first position relative to said another tile, identifying a first logical operation between search query terms for corresponding searchable fields of said one tile and said another tile, and to a second position relative to said another tile, identifying a second logical operation between search query terms for corresponding searchable fields of said one tile and said another tile.

4. A method for enabling a user to create a search query for searching a database, comprising:
   providing a first block in a graphical user interface, said first block including a first user movable tile;
   providing a second block in a graphical user interface, said second block including a second user movable tile, wherein each of said first user movable tile and said second user movable tile corresponding to at least one searchable field in the database;
   enabling a user to move said first user movable tile of said first block and second user movable tile of said second block;
   in response to a user moving said first user movable tile of said first block relative to second user movable tile of said second block, determining a relative position of said first block with respect to said second block;
   automatically identifying a logical operation between said first block and said second block based on the determined relative position of said first block with respect to said second block without further user input;
   enabling a user to input a first search term in said first block and a second search term in said second block; and
   automatically generating a search query for searching the database, wherein the search query includes the identified logical operation between the inputted first search term and the inputted second search term.

5. The method of claim 4, wherein the user moving said first user movable tile of said first block to a position horizontal to said second user movable tile of said second block identifies a first logical operation.

6. The method of claim 4, wherein the user moving said first user movable tile of said first block to a position vertical to said second user movable tile of said second block identifies a second logical operation.

7. The method of claim 4, wherein said first search term includes a search parameter corresponding to said at least one searchable field.

8. The method of claim 4, wherein said second search term includes a search parameter corresponding to said at least one searchable field.

9. The method of claim 4, wherein the moving of said first user movable tile and said second user movable tile is by dragging.

10. The method of claim 9, wherein one of said first user movable tile and said second user movable tile can be dragged and dropped more than once onto one of said first block and said second block for the same search.

11. The method of claim 4, further comprising the step of creating a sub-block comprising at least one input box in response to a user moving one of said first user movable tile and said second user movable tile into one of said first block and said second block.

12. The method of claim 4, further comprising the step of displaying on each of said first and second user movable tiles an identifier that identifies said at least one searchable field.

13. A system for enabling a user to create a search query for searching a database, comprising:
   means for providing a first block in a graphical user interface, said first block including a first user movable tile;
   means for providing a second block in a graphical user interface, said second block including a second user movable tile, wherein each of said first user movable tile and said second user movable tile corresponding to at least one searchable field in the database;
   means for enabling a user to move said first user movable tile of said first block and second user movable tile of said second block;
   a determining means that determines a relative position of said first block with respect to said second block, in response to a user moving said first user movable tile of said first block relative to second user movable tile of said second block;
   a identifying means that identifies a logical operation between said first block and said second block based on the determined relative position of said first block with respect to said second block without further user input;
   means for enabling a user to input a first search term in said first block and a second search term in said second block; and
   means for automatically generating a searching query for searching the database, wherein the search query includes the identified logical operation between the inputted first search term and the inputted second search term.

14. The system of claim 13, wherein the identifying means identifies a first logical operation after user moving said first user movable tile of said first block to a position horizontal to said second user movable tile of said second block.

15. The system of claim 13, wherein the identifying means identifies a second logical operation after user moving said first user movable tile of said first block to a position vertical to said second user movable tile of said second block.

16. The system of claim 13, wherein said first search term includes a search parameter corresponding to said at least one searchable field.

17. The system of claim 13, wherein said second search term includes a search parameter corresponding to said at least one searchable field.

18. The system of claim 13, the moving of said first user movable tile and said second user movable tile is by dragging.

19. The system of claim 18, wherein one of said first user movable tile and said second user movable tile can be dragged and dropped more than once onto one of said first block and said second block for the same search.

20. The system of claim 13, further comprising means for creating a sub-block comprising at least one input box in response to a user moving one of said first user movable tile and said second user movable tile into one of said first block and said second block.

21. The system of claim 13, further comprising means for displaying on each of said first and second user movable tiles an identifier that identifies said at least one searchable field.

22. A system for enabling a user to create a search query for searching a database, comprising:
   a module for providing a first block in a graphical user interface, said first block including a first user movable tile;
   a module for providing a second block in a graphical user interface, said second block including a second user movable tile, wherein each of said first user movable tile and said second user movable tile corresponding to at least one searchable field in the database;
   a module for enabling a user to move said first user movable tile of said first block and second user movable tile of said second block;
   a determining module that determines a relative position of said first block with respect to said second block, in response to a user moving said first user movable tile of said first block relative to second user movable tile of said second block;
   a identifying module that identifies a logical operation between said first block and said second block based on the determined relative position of said first block with respect to said second block without further user input;

a module for enabling a user to input a first search term in said first block and a second search term in said second block; and a module for automatically generating a searching query for searching the database, wherein the search query includes the identified logical operation between the inputted first search term and the inputted second search term.

23. The system of claim 22, wherein the identifying module identifies a first logical operation after user moving said first user movable tile of said first block to a position horizontal to said second user movable tile of said second block.

24. The system of claim 22, wherein the identifying module identifies a second logical operation after user moving said first user movable tile of said first block to a position vertical to said second user movable tile of said second block.

25. The system of claim 22, wherein said first search term includes a search parameter corresponding to said at least one searchable field.

26. The system of claim 22, wherein said second search term includes a search parameter corresponding to said at least one searchable field.

27. The system of claim 22, wherein the moving of said first user movable tile and said second user movable tile is by dragging.

28. The system of claim 27, wherein one of said first user movable tile and said second user movable tile may dragged and dropped more than once onto one of said first block and said second block for the same search.

29. The system of claim 22, further comprising a module for creating a sub-block comprising at least one input box in response to a user moving one of said first user movable tile and said second user movable tile into one of said first block and said second block.

30. The system of claim 22, further comprising means for displaying on each of said first and second user movable tiles an identifier that identifies said at least one searchable field.

31. A computer program product for enabling a user to create a search query for searching a database, the computer program product being embodied in a computer readable medium and comprising computer instructions for:

providing a first block in a graphical user interface, said first block including a first user movable tile;

providing a second block in a graphical user interface, said second block including a second user movable tile, wherein each of said first user movable tile and said second user movable tile corresponding to at least one searchable field in the database;

enabling a user to move said first user movable tile of said first block and second user movable tile of said second block;

in response to a user moving said first user movable tile of said first block relative to second user movable tile of said second block, determining a relative position of said first block with respect to said second block;

automatically identifying a logical operation between said first block and said second block based on the determined relative position of said first block with respect to said second block without further user input;

enabling a user to input a first search term in said first block and a second search term in said second block; and automatically generating a searching query for searching the database, wherein the search query includes the identified logical operation between the inputted first search term and the inputted second search term.

32. The computer program product of claim 31, wherein the user moving said first user movable tile of said first block to a position horizontal to said second user movable tile of said second block identifies a first logical operation.

33. The computer program product of claim 31, wherein the user moving said first user movable tile of said first block to a position vertical to said second user movable tile of said second block identifies a second logical operation.

34. The computer program product of claim 31, wherein said first search term includes a search parameter corresponding to said at least one searchable field.

35. The computer program product of claim 31, wherein said second search term includes a search parameter corresponding to said at least one searchable field.

36. The computer program product of claim 31, wherein the moving of said first user movable tile and said second user movable tile is by dragging.

37. The computer program product of claim 36, wherein one of said first user movable tile and said second user movable tile can be dragged and dropped more than once onto one of said first block and said second block for the same search.

38. The computer program product of claim 31, further comprising computer instructions for creating a search query.

39. The computer program product of claim 31, further comprising computer instructions for creating a sub-block comprising at least one input box in response to a user moving one of said first user movable tile and said second user movable tile into one of said first block and said second block.

40. The computer program product of claim 31, further comprising computer instructions for displaying on each of said first and second user movable tiles an identifier that identifies said at least one searchable field.

41. A method for receiving and processing search queries for searching a database, the method comprising:

providing a plurality of user movable tiles, each of said plurality of user movable tiles including its own data;

providing a first block in a graphical user interface, said first block including one or more of said plurality of user movable tiles;

providing a second block in a graphical user interface, said second block including one or more of said plurality of user movable tiles;

enabling a user to drag at least one user movable tile of said plurality of user movable tiles and drop into one of said first and second block; and in response to user dragging said at least one user movable tile and dropping into said first block, identifying a first logical operation between data of the dropped said at least one user movable tile and data of each other user movable tile in said first block, and identifying a second logical operation between data of each user movable tile in said first block and data of each user movable tile in said second block.

42. The method of claim 41, wherein said first logical operation is identified based on a relative position of said at least one user movable tile with respect to said each other user movable tile in said first block.

43. The method of claim 41, wherein said second logical operation is identified based on a relative position of said each user movable tile in said first block with respect to said each user movable tile in said second block.

* * * * *